US012602621B2

(12) United States Patent (10) Patent No.: US 12,602,621 B2
Yoon et al. (45) Date of Patent: Apr. 14, 2026

(54) METHOD AND APPARATUS FOR PERFORMING WIRELESS SENSING BY COLLECTING EMPTY DATA ON BASIS OF WIRELESS SENSING

(71) Applicant: LG ELECTRONICS INC., Seoul (KR)

(72) Inventors: Jeonghwan Yoon, Seoul (KR); Hangyu Cho, Seoul (KR); Hongwon Lee, Seoul (KR); Homin Yoo, Seoul (KR); Taesung Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 335 days.

(21) Appl. No.: 18/270,452

(22) PCT Filed: Jan. 5, 2021

(86) PCT No.: PCT/KR2021/000042

§ 371 (c)(1),
(2) Date: Jun. 29, 2023

(87) PCT Pub. No.: WO2022/149621

PCT Pub. Date: Jul. 14, 2022

(65) Prior Publication Data

US 2024/0063927 A1 Feb. 22, 2024

(51) Int. Cl.
| *H04B 17/309* | (2015.01) |
| *G06N 20/00* | (2019.01) |
| *H04W 4/20* | (2018.01) |
| *H04W 84/12* | (2009.01) |

(52) U.S. Cl.
CPC ........... *H04B 17/309* (2015.01); *G06N 20/00* (2019.01); *H04W 4/20* (2013.01); *H04W 84/12* (2013.01)

(58) Field of Classification Search
CPC ........... G06N 3/08; G06N 20/00; H04W 4/33; H04W 84/12; H04B 17/309
See application file for complete search history.

(56) References Cited

U.S. PATENT DOCUMENTS

| 9,383,438 | B2 * | 7/2016 | Ishihara | ................ G01S 13/003 |
| 11,271,629 | B1 * | 3/2022 | Um | ........................ H04W 24/08 |
| 11,277,465 | B2 * | 3/2022 | Chmielewski | ......... G05B 15/02 |
| 2014/0015706 | A1 * | 1/2014 | Ishihara | ................ G01S 13/003 |
| | | | | 342/27 |
| 2017/0118239 | A1 * | 4/2017 | Most | ........................ H04L 67/10 |
| 2019/0124134 | A1 * | 4/2019 | Chmielewski | ...... H04L 12/2809 |

FOREIGN PATENT DOCUMENTS

| KR | 20150107005 | 9/2015 |
| KR | 20160027923 | 3/2016 |
| WO | 2017069542 | 4/2017 |

* cited by examiner

*Primary Examiner* — Abdullahi E Salad
(74) *Attorney, Agent, or Firm* — BRYAN CAVE LEIGHTON PAISNER LLP

(57) ABSTRACT

A method and apparatus for performing wireless sensing in a wireless LAN system on the basis of wireless sensing are proposed. Specifically, a wireless device determines a first time for collecting empty data. The wireless device collects empty data during the first time. The empty data is a wireless signal when there is no user in a preset space.

12 Claims, 18 Drawing Sheets

FIG. 1
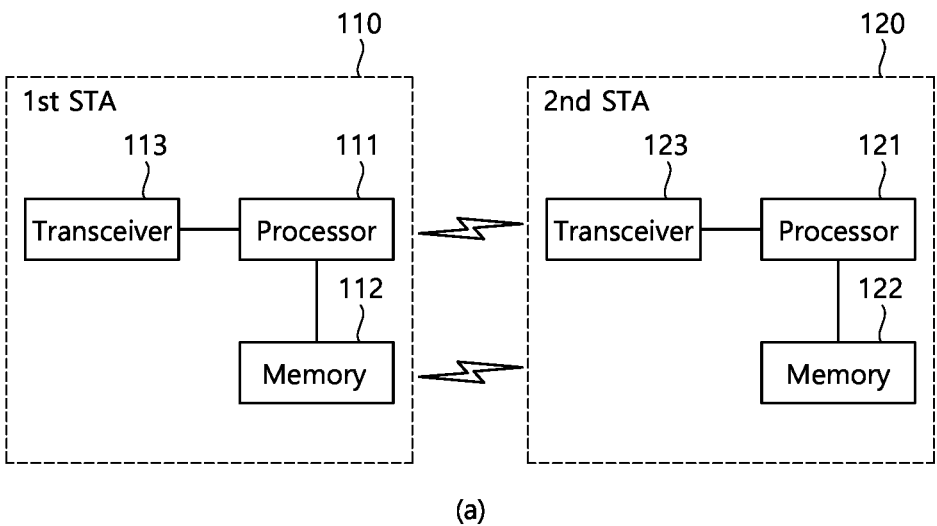
(a)
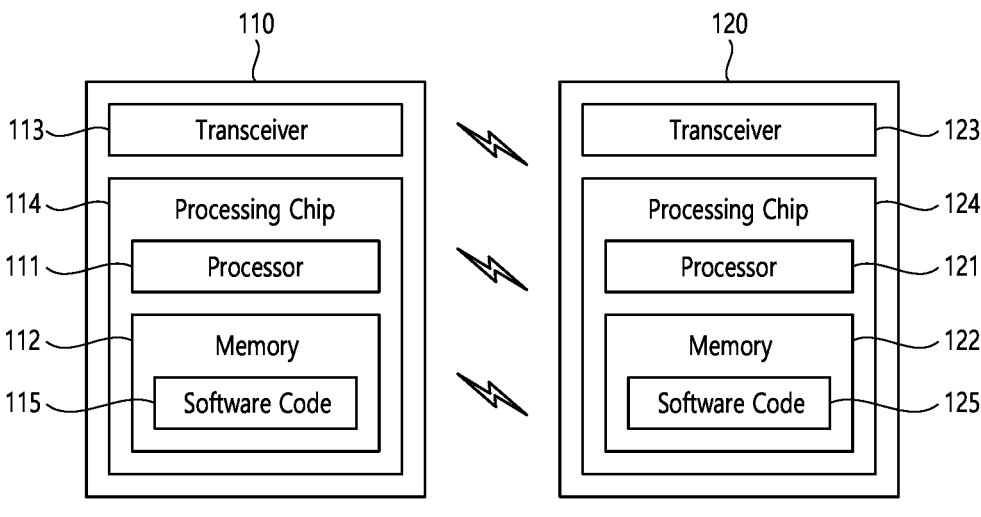
(b)

FIG. 2
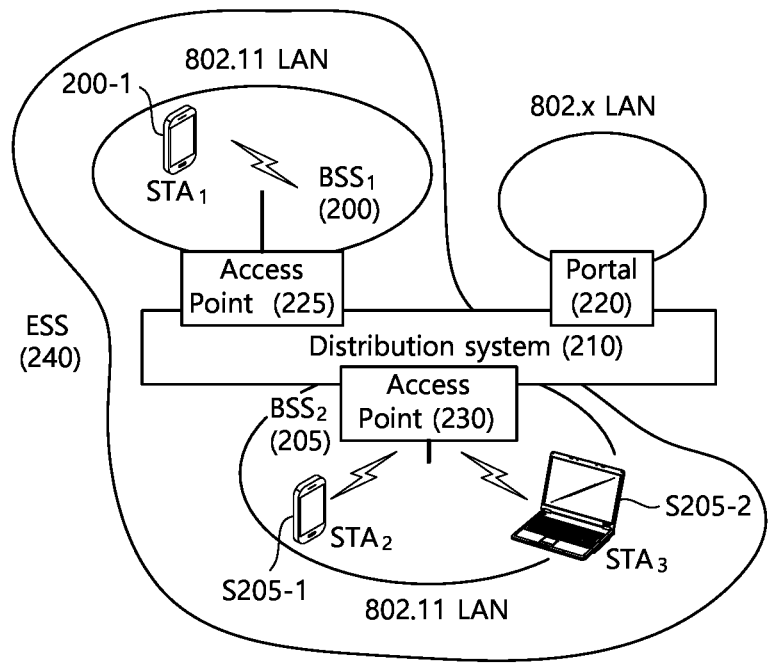
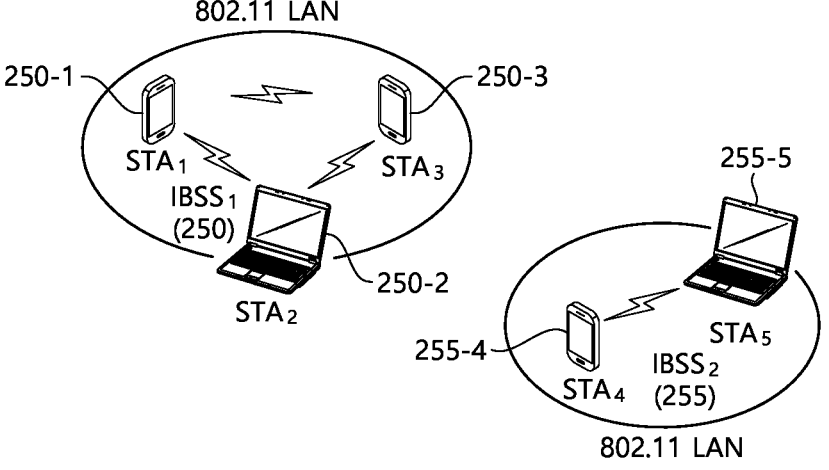

WiFI signal characteristics in an empty environment (a) No Human Presence

WiFI signal characteristics in an environment with people (b) Walking

FIG. 9

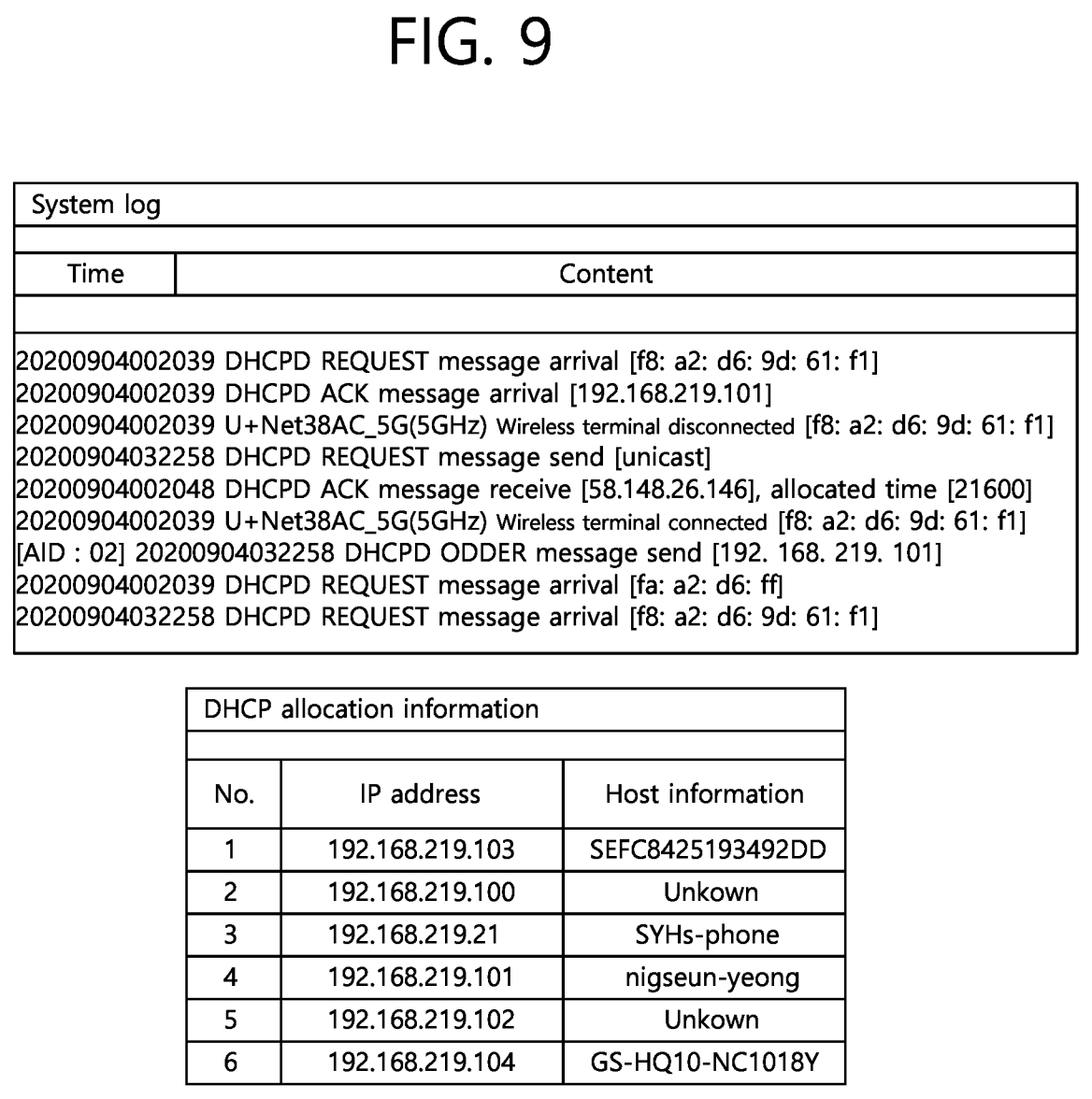

System log

| Time | Content |
|---|---|
| 20200904002039 | DHCPD REQUEST message arrival [f8: a2: d6: 9d: 61: f1] |
| 20200904002039 | DHCPD ACK message arrival [192.168.219.101] |
| 20200904002039 | U+Net38AC_5G(5GHz) Wireless terminal disconnected [f8: a2: d6: 9d: 61: f1] |
| 20200904032258 | DHCPD REQUEST message send [unicast] |
| 20200904002048 | DHCPD ACK message receive [58.148.26.146], allocated time [21600] |
| 20200904002039 | U+Net38AC_5G(5GHz) Wireless terminal connected [f8: a2: d6: 9d: 61: f1] [AID : 02] |
| 20200904032258 | DHCPD ODDER message send [192. 168. 219. 101] |
| 20200904002039 | DHCPD REQUEST message arrival [fa: a2: d6: ff] |
| 20200904032258 | DHCPD REQUEST message arrival [f8: a2: d6: 9d: 61: f1] |

DHCP allocation information

| No. | IP address | Host information |
|---|---|---|
| 1 | 192.168.219.103 | SEFC8425193492DD |
| 2 | 192.168.219.100 | Unkown |
| 3 | 192.168.219.21 | SYHs-phone |
| 4 | 192.168.219.101 | nigseun-yeong |
| 5 | 192.168.219.102 | Unkown |
| 6 | 192.168.219.104 | GS-HQ10-NC1018Y |

(b) Walking

METHOD AND APPARATUS FOR PERFORMING WIRELESS SENSING BY COLLECTING EMPTY DATA ON BASIS OF WIRELESS SENSING

CROSS-REFERENCE TO RELATED APPLICATIONS

This application is the National Stage filing under 35 U.S.C. 371 of International Application No. PCT/KR2021/000042, filed on Jan. 5, 2021, the contents of which are all hereby incorporated by reference herein in their entirety.

TECHNICAL FIELD

The present specification relates to a method for detecting an intruder based on wireless sensing, and more particularly, to a method and apparatus in which a wireless device collects empty data and performs wireless sensing.

BACKGROUND

As wireless technology and sensing methods advance, many studies use wireless signals (for example, WiFi) to detect human activity, it has succeeded in realizing various fields of application, intrusion detection, daily activity recognition, vital sign monitoring related to more granular motion detection and gesture recognition for user identification, etc.

These applications can support a variety of domains for smart home and office environments, including safety protection, wellness monitoring/management, smart healthcare, and smart appliance interactions.

Human movement affects wireless signal propagation (e.g., reflection, diffraction, and scattering), providing an excellent opportunity to capture human movement by analyzing the received wireless signal. Because of its frequency-shifting, low-cost, and non-intrusive detection properties, whether researchers extract ready-to-use signal measurements or adopt frequency-modulated signals, wireless-based human activity detection has attracted considerable interest and has become a prominent research area in the past decade.

This specification examines the existing wireless sensing system in terms of basic principle, technology and system architecture. Specifically, this specification describes how wireless signals can be utilized to facilitate a variety of applications including intrusion detection, room occupancy monitoring, daily activity recognition, gesture recognition, vital sign monitoring, user identification and indoor location. Future research directions and limitations of using wireless signals for human activity detection are also discussed.

SUMMARY

The present specification proposes a method and apparatus for performing wireless sensing by collecting empty data based on wireless sensing.

An example of the present specification proposes a method in which a wireless device collects empty data and performs wireless sensing.

This embodiment proposes a method for effectively collecting empty data because a wireless device based on wireless sensing needs empty data for post-learning in a target environment. In particular, this embodiment can prevent unnecessary data collection when it is not in an empty state by identifying a collection time point of the empty data.

A wireless device determines a first time point to collect empty data. At this time, the empty data is a wireless signal when there is no user in the preset space.

The wireless device collects the empty data during the first time point. That is, the present embodiment can reduce the number of attempts to collect the empty data by limiting the collection time point of the empty data to the first time point.

According to the embodiment proposed in this specification, by performing a method for collecting wireless signals in an improved manner, the empty state can be determined in advance, so there is no need to continuously collect data. There is a new effect that it is possible to predict a user model without the help of a device that has been learned through the empty data.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 9 shows a system log and DHCP allocation information.

DETAILED DESCRIPTION

Figure 3:
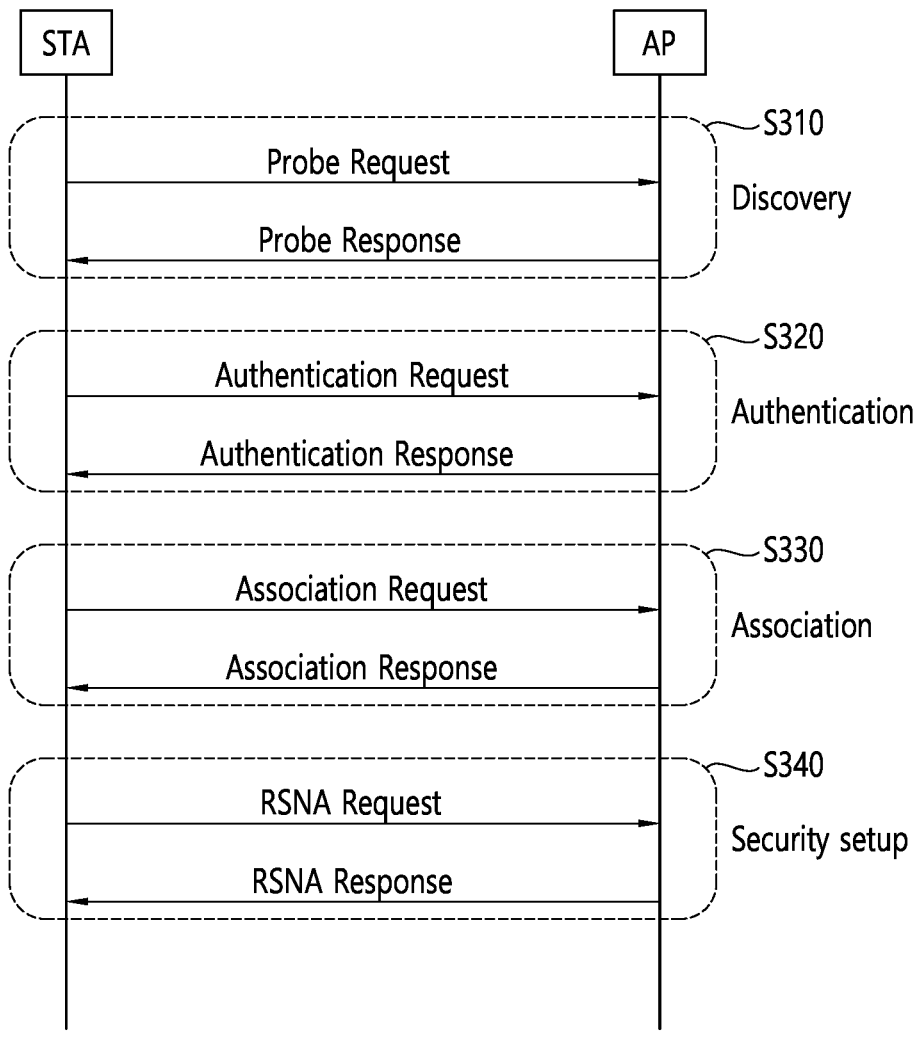
FIG. 3 is a drawing for explaining a general link setup process.

In the present specification, "A or B" may mean "only A", "only B" or "both A and B". In other words, in the present specification, "A or B" may be interpreted as "A and/or B".

For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP. In the present specification, the AP may also be indicated as an AP STA.

STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/ signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (i.e. EE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (S SID).

A portal 220 may serve as a bridge which connects the wireless LAN network (i.e., IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2,

250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 is a drawing for explaining a general link setup process.

In the illustrated step S310, the STA may perform a network discovery operation. The network discovery operation may include a scanning operation of the STA. That is, in order for the STA to access the network, the STA needs to find a network in which it can participate. An STA must identify a compatible network before participating in a wireless network. The process of identifying a network existing in a specific area is called scanning. Scanning methods include active scanning and passive scanning.

FIG. 3 exemplarily illustrates a network discovery operation including an active scanning process. In active scanning, an STA performing scanning transmits a probe request frame to discover which APs exist around it while moving channels, and waits for a response thereto. A responder transmits a probe response frame to the STA that has transmitted the probe request frame in response to the probe request frame. Here, the responder may be an STA that last transmitted a beacon frame in the BSS of the channel being scanned. In the BSS, since the AP transmits a beacon frame, the AP becomes the responder. In the IBSS, the STAs in the IBSS rotate and transmit the beacon frame, so the responder is not constant. For example, an STA that has transmitted a probe request frame on channel 1 and received a probe response frame on channel 1 stores BSS-related information included in the received probe response frame, The STA may move to the next channel (e.g., channel 2) and perform scanning (i.e., probe request/response transmission/reception on channel 2) in the same manner.

Although not shown in the example of FIG. 3, the scanning operation may be performed in a passive scanning manner. An STA performing scanning based on passive scanning may wait for a beacon frame while moving channels. The beacon frame is one of the management frames in IEEE 802.11, and is periodically transmitted to inform the existence of a wireless network, and to allow a scanning STA to search for a wireless network and participate in the wireless network. In the BSS, the AP plays a role of periodically transmitting a beacon frame, and in the IBSS, the STAs in the IBSS rotate and transmit the beacon frame. When the STA performing scanning receives the beacon frame, it stores information on the BSS included in the beacon frame and records the beacon frame information in each channel while moving to another channel Upon receiving the beacon frame, the STA may store BSS-related information included in the received beacon frame, move to the next channel, and perform scanning on the next channel in the same manner.

The STA discovering the network may perform an authentication process through step S320. This authentication process may be referred to as a first authentication process in order to clearly distinguish it from the security setup operation of step S340 to be described later. The authentication process of S320 may include a process in which the STA transmits an authentication request frame to the AP, and in response, the AP transmits an authentication response frame to the STA. An authentication frame used for an authentication request/response corresponds to a management frame.

The authentication frame may include information on an authentication algorithm number, an authentication transaction sequence number, a status code, a challenge text, a Robust Security Network (RSN), and a Finite Cyclic Group, etc.

The STA may transmit an authentication request frame to the AP. The AP may determine whether to allow authentication for the STA based on information included in the received authentication request frame. The AP may provide the result of the authentication process to the STA through the authentication response frame.

The successfully authenticated STA may perform a connection process based on step S330. The association process includes a process in which the STA transmits an association request frame to the AP, and in response, the AP transmits an association response frame to the STA. For example, the connection request frame may include information related to various capabilities, a beacon listening interval, a service set identifier (SSID), supported rates, supported channels, RSN, and mobility domain, supported operating classes, TIM broadcast request (Traffic Indication Map Broadcast request), interworking service capability, and the like. For example, the connection response frame includes information related to various capabilities, status codes, Association IDs (AIDs), support rates, Enhanced Distributed Channel Access (EDCA) parameter sets, Received Channel Power Indicator (RCPI), Received Signal to Noise (RSNI). indicator), mobility domain, timeout interval (association comeback time), overlapping BSS scan parameters, TIM broadcast response, QoS map, and the like.

Thereafter, in step S340, the STA may perform a security setup process. The security setup process of step S340 may include, for example, a process of private key setup through 4-way handshaking through an Extensible Authentication Protocol over LAN (EAPOL) frame.

As the demand for wireless data traffic increases, WiFi networks grow very rapidly as they provide high throughput and are easy to deploy. Recently, Channel State Information (CSI) measured by a WiFi network is widely used for various sensing purposes. In order to better understand the existing WiFi sensing technology and the future WiFi sensing trend, this specification comprehensively reviews the signal processing technology, algorithm, application, and performance results of WiFi sensing using CSI. Different WiFi sensing algorithms and signal processing technologies have their own advantages and limitations and are suitable for different WiFi sensing applications. This specification classifies CSI-based WiFi sensing applications into three categories: sensing, recognition, and estimation according to whether the output is binary/multi-class classification or numeric. With the development and deployment of new WiFi technologies, there will be more WiFi sensing opportunities where objects can move from humans to the environment, animals and objects.

This specification emphasizes the coexistence of three challenges in WiFi sensing: robustness and generalization, privacy and security, and WiFi sensing and networking. In addition, this specification proposes three future WiFi sensing trends: inter-layer network information integration, multi-device cooperation, and convergence of different sensors to enhance the existing WiFi sensing function and enable new WiFi sensing opportunities.

With the growing popularity of wireless devices, WiFi is growing very rapidly. One of the key technologies for WiFi's success is Multiple-Input Multiple-Output (MIMO), which provides high throughput to meet the growing demand for wireless data traffic. Together with Orthogonal Frequency-Division Multiplexing (OFDM), MIMO provides channel state information (CSI) for each transmit/receive antenna pair at each carrier frequency. Recently, CSI measurement of WiFi systems is used for various sensing purposes. WiFi sensing reuses the infrastructure used for wireless communication, making deployment easy and low cost. Also, unlike sensor-based and video-based solutions, WiFi sensing does not interfere with lighting conditions.

CSI refers to how a radio path propagates from a transmitter to a receiver at a specific carrier frequency along multiple paths. For WiFi systems with MIMO-OFDM, CSI is a 3D matrix of complex values representing the amplitude attenuation and phase shift of a multipath WiFi channel.

Time series of CSI measurements can be used for other wireless sensing applications by capturing how wireless signals travel through surrounding objects and people in time, frequency, and spatial domains. For example, CSI amplitude fluctuations in the time domain have different patterns depending on human, activity, gesture, etc., which can be used for human presence detection, fall detection, motion detection, activity recognition, gesture recognition, and human identification/authentication.

CSI phase shift in the spatial and frequency domains, i.e., transmit/receive antenna and carrier frequencies, is related to signal transmission delay and direction, which can be used for human location and tracking. The CSI phase shift in the time domain can have other dominant frequency components that can be used to estimate the respiration rate. Various WiFi sensing applications have specific requirements for signal processing techniques and classification/estimation algorithms.

This specification proposes signal processing technologies, algorithms, applications, performance results, challenges, and future trends of WiFi sensing through CSI to increase understanding of existing WiFi sensing technologies and gain insight into future WiFi sensing directions.

Figure 4:
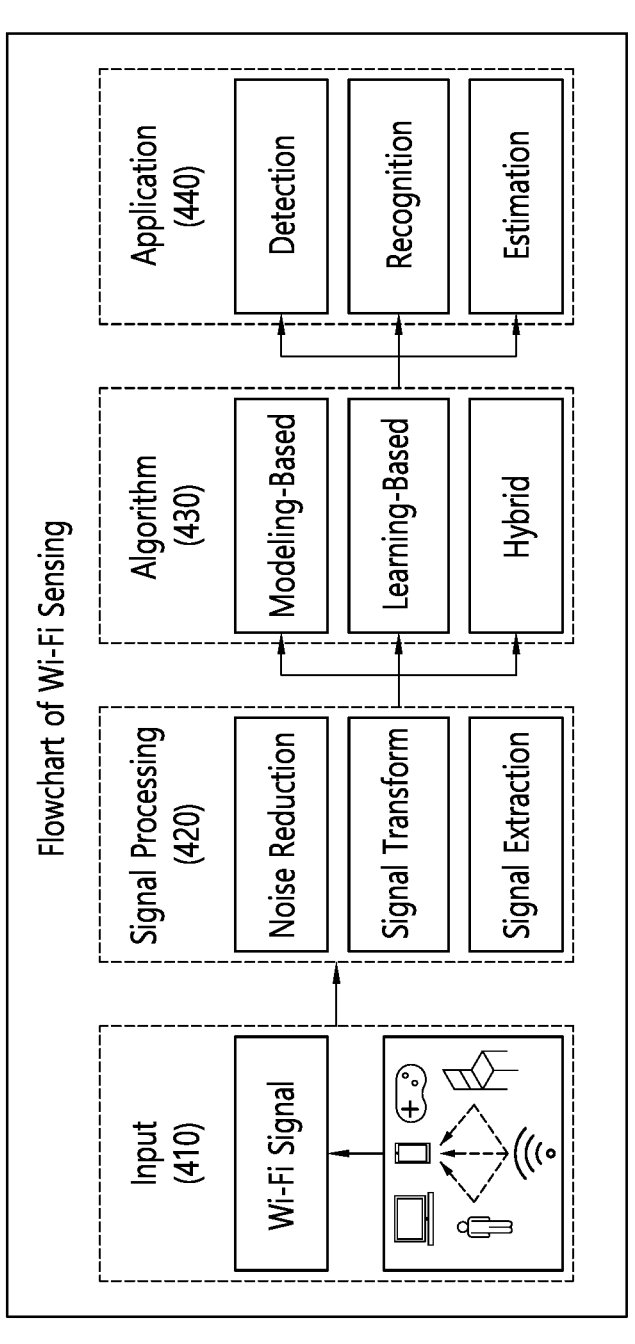
FIG. 4 shows a flowchart of a WiFi sensing procedure.

FIG. 4 shows a flowchart of a WiFi sensing procedure.

A WiFi signal (e.g., CSI measurement value) including a mathematical model, a measurement procedure, an actual WiFi model, a basic processing principle, and an experimental platform is input from the Input stage 410. Raw CSI measurements are fed to a signal processing module for noise reduction, signal conversion and/or signal extraction as indicated by the Signal Processing stage 420.

The pre-processed CSI tracking is supplied as a modeling-based, learning-based or hybrid algorithm, such as the Algorithm stage 430, to obtain an output for various WiFi sensing purposes. Depending on the output type, WiFi sensing can be classified into three categories. At the Application stage 440, the detection/recognition application tries to solve the binary/multi-class classification problem, and the estimation application tries to obtain the quantity values of other tasks.

Figure 5:
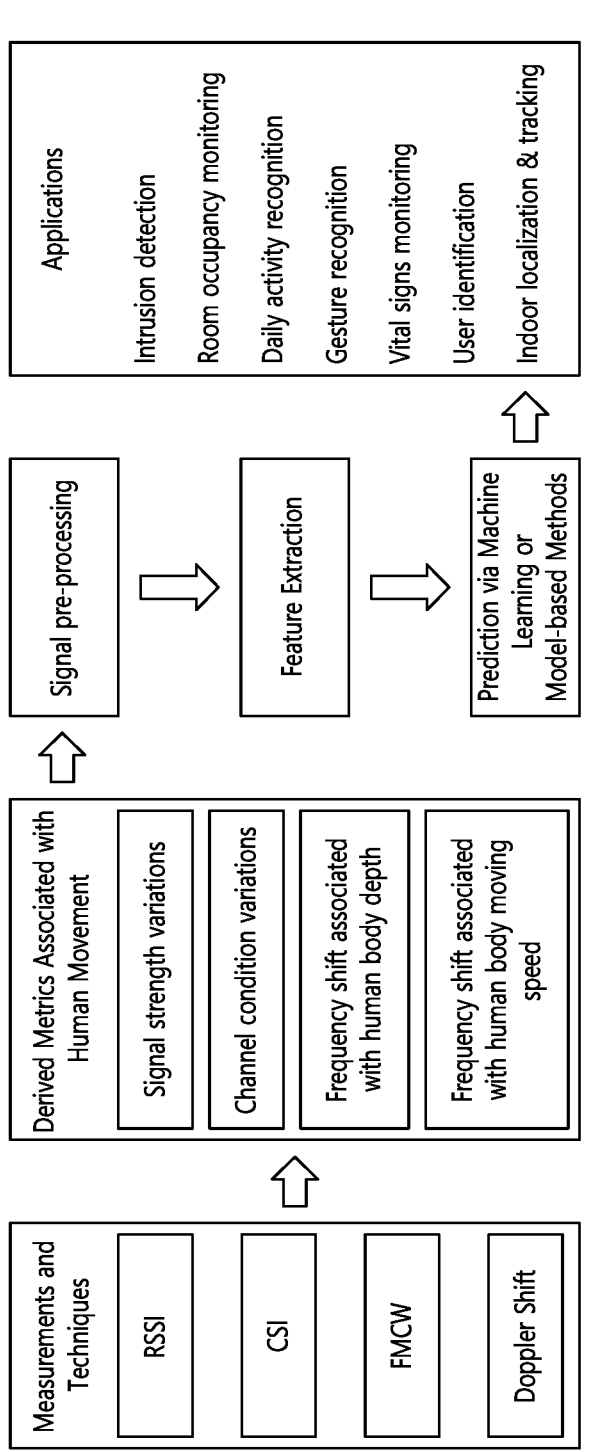
FIG. 5 shows a flow diagram of a general procedure of sensing human activity through a wireless signal.

FIG. 5 shows a flow diagram of a general procedure of sensing human activity through a wireless signal.

Specifically, the sensing system extracts signal changes related to human activity first based on different sensing methods (e.g., Received Signal Strength Indicator (RSSI), Channel State Information (CSI), Frequency Modulated Carrier Wave (FMCW) and Doppler shift).

That is, the human activity sensing procedure of FIG. 5 is as follows.

1) Measurements: Measure RSSI, CSI, Doppler shift, etc. as input values
2) Derived Metrics with Human movements: Signal strength variations, Channel condition variations, Frequency shift associated with human body depth, Frequency shift associated with human moving speed 3) Signal Pre-processing: Noise reduction, Signal Time-Frequency Transform, Signal Extraction 4) Feature Extraction: Extracts user ID features using gait cycle, body speed, and human activity 5) Prediction via Machine/Deep learning: Algorithms 6) Application: Detection, Recognition, Estimation (Intrusion detection, Room occupancy monitoring, Daily activity recognition, Gesture recognition, Vital signs monitoring, User identification, Indoor localization & tracking) of User identification prediction model

1. WIRELESS SENSING, WI-FI, MACHINE LEARNING

Background of the Disclosure

The IoT future smart home market is changing from device connection-centric to service-centric, and as a result, the need for AI device-based personalization and automation services is increasing. Wireless sensing-based technology, which is one of the element technologies for IoT service of artificial intelligence devices, is being actively developed. Among them, research on user identification by learning the pattern of a wireless signal such as Wi-Fi has unique characteristics according to a person's gait or behavior is being actively conducted.

Background Technology and Problems

In order to mount Wireless Sensing-based User Identification technology on commercial products, it is difficult to learn and distribute a model for prediction of data collected in Machine Learning in advance. (For example, a model that predicts dogs and cats is learned and deployed in advance and predicted new images not used in learning). The wireless signal may vary depending on the environment, even for the same user, as the signal pattern is different according to the influence of the user's movement. For this reason, since it is not possible to generate and distribute a general model in advance, it is necessary to create a model through learning suitable for each environment in order to mount a commercial product. However, prior learning using supervised learning used in existing research requires user participation for the collection and labeling of learning data (matching the correct answer of the data), so the practicality of commercialization is low.

Therefore, the present specification proposes a post-learning automation method for wireless sensing-based user identification.

When learning the wireless sensing signal pattern suitable for each environment, it enables post-learning by collecting the correct answer (e.g., label) for learning using the personal identification information of the user device (Personal Electronic Device—PED). The learning method for post-learning may be applied to various methods such as unsupervised learning, supervised learning, semi-supervised learning, and unsupervised/supervised fusion learning.

Through this embodiment, it is possible to implement a system that predicts by learning a signal pattern suitable for the user's home environment, thereby creating a new paradigm of IoT future smart home devices such as artificial intelligence devices that identify people.

Example of Wi-Fi CSI-Based User Identification Study

An example of a study for learning/predicting using Wi-Fi CSI using wireless signal refinement, feature extraction, and machine learning is as follows.

1) Signal Pre-Processing

CSI measurement collection—Collect CSI measurement values of 30-52 subcarriers based on 20 MHz bandwidth as many as the number of TX/RX antennas.

Denoising—Removes noise from signals using algorithms such as PCA (Principal Component Analysis), phase unwrapping, and band-pass Butterworth filter.

Transform to Time-Frequency domain—Spectrogram generation using STFT (Shot-Time Fourier Transform) (refer to FIG. 6)→The denoising waveform is mixed with the reflection shape of the human body part, which can be classified by frequency.

Figure 6:
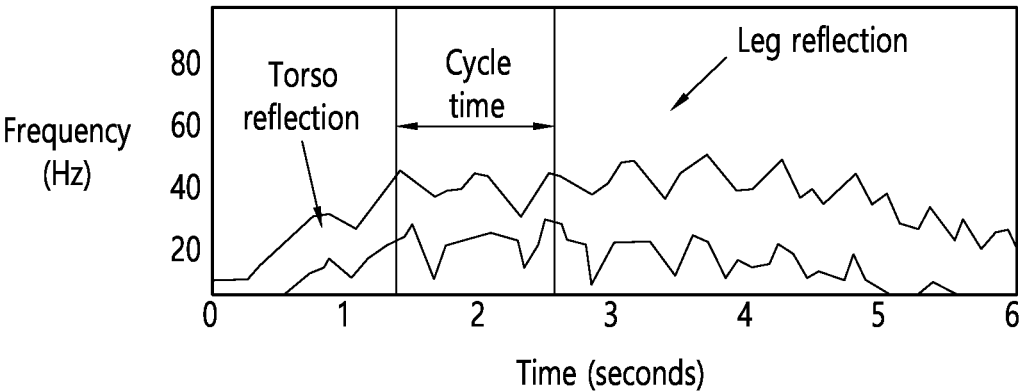
FIG. 6 shows a CSI spectrogram according to a human gait.

FIG. 6 shows a CSI spectrogram according to a human gait.

Referring to FIG. 6, torso reflection and leg reflection are illustrated in a CSI spectrogram in a time/frequency domain. In this case, the CSI spectrogram has a certain cycle time.

2) Feature Extraction

The process of extracting features for user identification learning and prediction Use Gait Cycle Time, Movement (or Torso) Speed, Human Activity, etc.

Based on the theory that the gait cycle is unique to each person, it is used as a feature of User Identification Example of body velocity estimation method: using the percentile method used in Doppler Radar Example of Human Activity estimation method: Predicting human movements and contours using time domain features (max, min, mean, skewness, kurtiosis, std), which are low level features of CSI; Predicting the movement speed of the trunk and legs using frequency domain features (spectrogram energy, percentile frequency component, spectrogram energy difference); and Expressing walking or stationary activities using these features.

3) Machine/Deep Learning Based Training and Prediction

Learning and prediction through various machine/deep learning-based algorithms

Representative Algorithm i) Supervised Learning: Using machine learning and deep learning algorithms such as decision tree-based machine learning classifier, SVM (Support Vector Machine), Softmax classifier, etc.

i)-1 The predictive model is created only by supervised learning, and the unsupervised learning algorithm is used to construct the layers of the supervised learning model (some studies)

Learning method i) Select Training/Evaluation data at a specific ratio by collecting data under specific environmental conditions for each person (e.g., Training data: Evaluation data=8:2)→Holdout verification ii) Training data is trained by manually mapping the correct answer (e.g. Label) for each person and using it as an input for the Machine/Deep learning model.

iii) In some studies, auto feature extraction and clustering are performed using unsupervised learning to increase the degree of freedom of the data collection environment, and then user identification is performed using a supervised learning model (e.g., Softmax classifier).

Unsupervised learning is a learning method in which only the problem is studied without teaching the answer (label). According to unsupervised learning, the answer is found by clustering (a typical example of unsupervised learning), etc. based on the relationship between variables (e.g., recommending a YouTuber, classifying animals).

In contrast, supervised learning is a learning method that teaches and studies answers. Supervised learning is divided into regression and classification. Regression is a learning method that predicts outcomes within a continuous data range (e.g., age 0-100). Classification is a learning method that predicts outcomes within a range of discretely separated data (for example, whether a tumor is malignant or benign).

In addition, semi-supervised learning is a method of learning data with and without answers at the same time, and it is a learning method that studies a lot of data without answers without discarding them.

Figure 7:
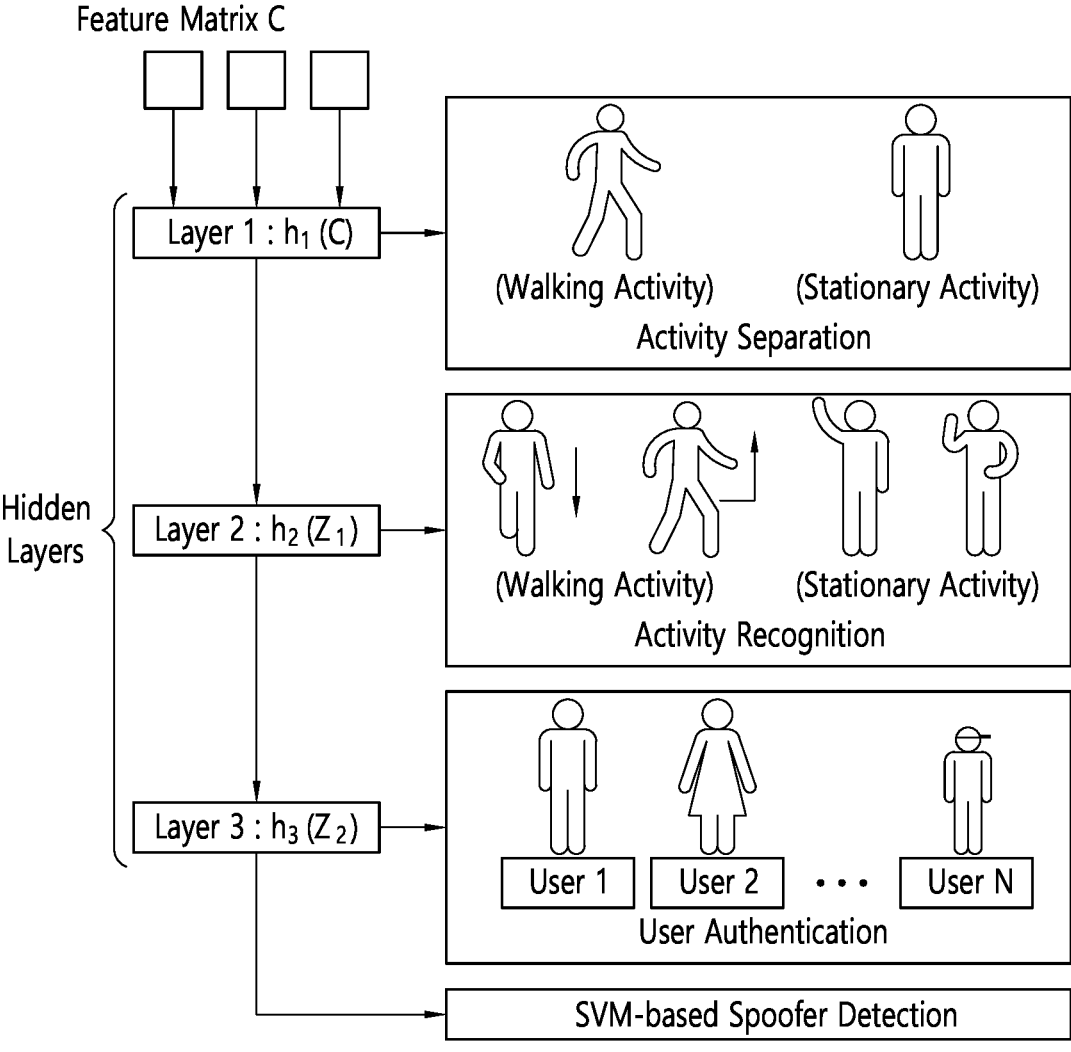
FIG. 7 shows a deep learning architecture for user authentication.

FIG. 7 shows a deep learning architecture for user authentication.

The deep learning architecture of FIG. 7 is an example of performing auto feature extraction using an autoencoder for each hidden layer and using softmax classification for classification.

Referring to FIG. 7, the supervised learning model constitutes each hidden layer, and the unsupervised learning model is used only for constructing the corresponding layer. Activity Separation, Activity Recognition, and User Authentication of FIG. 7 are all characteristics obtained by auto feature extraction.

2. DETAILED DESCRIPTION OF THE SPECIFICATION

Background of Disclosure

The IoT future smart home market is changing from device connection-oriented to service-oriented, and as a result, the need for artificial intelligence device-based personalization and automation services is increasing. Development of wireless sensing-based technology, which is one of the element technologies for IoT service of artificial intelligence devices, is being actively developed. Among them, research on human recognition and user identification by learning the pattern of this signal using the fact that changes in wireless signals such as Wi-Fi have unique characteristics according to human gait or behavior is being actively conducted.

Prior Art and Problems

In the existing research on wireless sensing-based human recognition and user identification technology, detection and identification are performed using wireless signal patterns (Wi-Fi CSI, etc.). Since the wireless signal changes sensitively according to the user's location and movement, it is difficult to learn in advance from the point of view of commercialization.

Post-learning is necessary to suit each environment. Involving users in learning is not only difficult in reality, but also has a high probability of not being collected to reflect the user's natural life pattern. Therefore, automatic labeling is required for applications such as human recognition and user identification using wireless sensing. In addition, data on the empty state is absolutely necessary apart from application scenarios.

Therefore, this specification proposes a method to improve the method of collecting empty data when learning wireless sensing.

Using the surrounding information of the environment to be collected by Wireless Sensing, it is possible to grasp the exact collection condition of empty data in the collection environment.

Specifically, the Wireless Sensing device predicts the PED (personal device) access information of the wireless router, the P2P access information of the Wireless Sensing collection device and the PED (personal device), the location information of the PED, and the time period when the user is not moving. Empty data can be collected by considering the time zone designation, etc. As a result, through the proposed method, it is possible to implement a commercial product that can detect people and identify users using Wireless Sensing, and a new paradigm of IoT future smart home devices such as 'artificial intelligence devices that recognize and identify people' can be created.

Automatic collection of empty data is a prerequisite for applying after-market auto-learning when learning and predicting using wireless signals. (Since the characteristics of each environment are different due to the characteristics of wireless signals, data must be collected in each environment to ensure the performance of the learning model)→In order to learn the model from the point of view of commercialization when applied to the product, post-learning optimized for the home environment by minimizing customer help is required.

Utilization: it can be used to collect data for non-presence learning of presence/motion detection technology that can be applied to various use cases such as surveillance, automatic device control, occupancy mode, and sleep monitoring by detecting whether there is a person in the house/in a specific space in the house. For example, anomaly detection can be performed using a One-Class Classification algorithm that learns and predicts only with empty data.

Existing protocols based on Wireless Sensing and existing operation methods are described as follows. 1) The transmitting device transmits a signal that can be measured such as Wi-Fi CSI (Channel State Information). 2) The receiving device measures the CSI wireless signal sent from the transmitting device. 3) The transmitting and receiving devices perform wireless signal pre-processing to refine the collected signal. 4) The transmitting and receiving devices perform a process of extracting features for learning and prediction (Feature Extraction). 5) The transmitting and receiving device divide the data set that has gone through Wireless Signal Pre-processing and Feature Extraction into an appropriate ratio (e.g., 8:2), uses a large ratio as data input for learning, and uses the remaining data for evaluation of the learning model.

Figure 8:
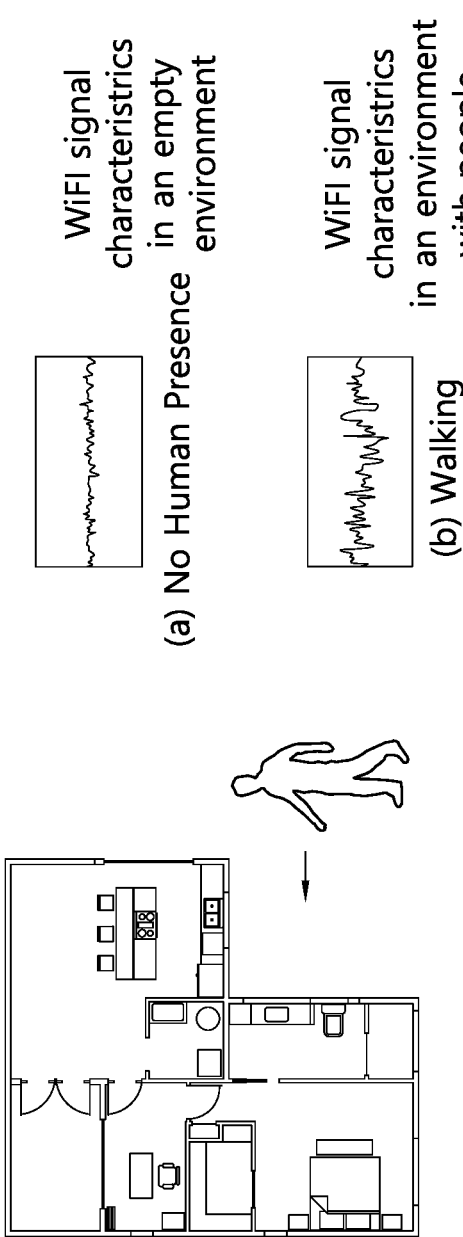
FIG. 8 shows characteristics of a wireless signal in an empty environment and characteristics of a wireless signal in an environment with people.

FIG. 8 shows characteristics of a wireless signal in an empty environment and characteristics of a wireless signal in an environment with people.

Referring to FIG. 8, the relative magnitude of a wireless signal in an empty environment hardly fluctuates, but the relative magnitude of a wireless signal in an environment with people fluctuates whenever it moves.

Since the wireless signal sensitively changes according to the user's location and movement, it is difficult to perform pre-learning from a commercialization point of view, and post-learning in the wireless sensing target environment is required. For post-learning in the target environment, data on the empty state (a state in which there are no people in the target space) is absolutely necessary. However, it is difficult to determine when to collect data. If data with people is incorrectly labeled as Empty, and learning proceeds, there is a possibility of serious performance degradation.

Therefore, this specification proposes a method to improve the empty data collection method during wireless sensing post-learning.

First, an example in which the wireless sensing device determines the empty data collection point through checking the PED connection status of the home network will be described.

A device that can check the home network connection state (e.g., wireless router) can check the current user's device connection state. Wireless Sensing devices can utilize this information to determine the state of the user's access to the house.

FIG. 9 shows a system log and DHCP allocation information.

The method of using the PED access state of the home network is as follows.

Assuming that there is a device A that can check the PED connection status of the home network, the device A can query the system log and DHCP (Dynamic Host Configuration Protocol) allocation information (FIG. 9), it can determine when users manually or automatically connect/disconnect from the network at home. With this information, the device A can determine when no one is currently home. At this time, the wireless sensing data for the empty environment can be collected by transmitting the corresponding point in time to each wireless sensing device. The collected data goes through an evaluation process and is finally judged as empty data. (Signal Pre-processing→Through the Feature Extraction process, a method of comparing the change in Signal with Expected Empty using statistics (Moving Variance, standard deviation, etc.) can be applied)

As another example, an example of determining when a wireless sensing device collects empty data through PED device status check will be described.

Wireless Sensing device receives status information (location, Advertising/Discovery, etc.) from PED (user's personal device). Wireless Sensing devices can utilize this information to determine the state of the user's access to the house.

The method of using PED status information is as follows.

Wireless Sensing devices can discover if there are PEDs nearby. Wireless Sensing devices can query the location of registered PED devices. The Wireless Sensing device can know the status of being connected to the PED. The wireless sensing device can use the above information to determine whether there is a person in the house.

The collected data goes through the evaluation process and is finally judged as empty data (through Signal Pre-processing→Feature Extraction, a method of comparing signal changes with expected empty using statistics (Moving Variance, standard deviation, etc.) can be applied).

As another example, an example in which the wireless sensing device determines the empty data collection point by designating a time period will be described.

The wireless sensing device can determine the time of empty data collection by designating a time period when the user is not moving (e.g. early morning).

The method for selecting a non-moving time period is as follows.

The Wireless Sensing device designates the morning time zone (e.g. 2:00 AM to 4:00 AM) and collects Wireless Signal Data at that time.

The collected data goes through an evaluation process and is finally judged as empty data. (Signal Pre-processing→Through the feature extraction process, a method of comparing the change in signal with Expected Empty using statistics (moving variance, standard deviation, etc.) can be applied.)

If it is determined that the collected data is not empty data, the wireless sensing device monitors other time zones to find the optimal time zone.

Figure 10:
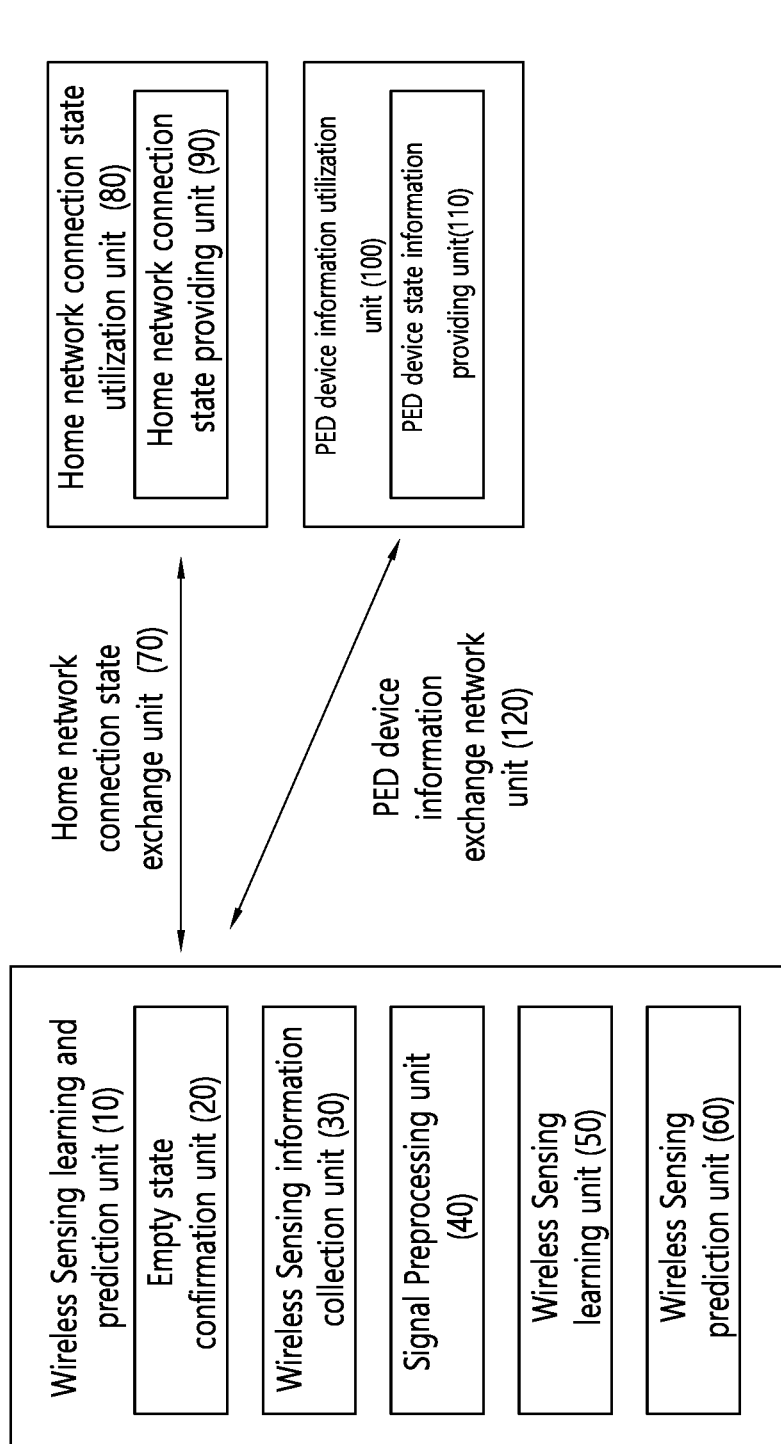
FIG. 10 shows a block diagram of a functional unit that improves the empty data collection method during wireless sensing post-learning.

FIG. 10 shows a block diagram of a functional unit that improves the empty data collection method during wireless sensing post-learning.

The functional unit of FIG. 10 is largely composed of a Wireless Sensing learning and prediction unit 10, a home network device connection state utilization unit 80, and a PED device information utilization unit 100. The functional unit shown in FIG. 10 can be defined as follows.

First, the Wireless Sensing learning and prediction unit 10 includes an empty state confirmation unit 20, a wireless sensing information collection unit 30, a signal preprocessing unit 40, a wireless sensing learning unit 50, and a wireless sensing prediction unit 60. The empty state confirmation unit 20 serves to check the empty state based on home network access state checking information. Wireless Sensing information collection unit 30 serves to collect data by receiving a wireless signal. The Signal Preprocessing unit 40 preprocesses the collected CSI Data (De-noising, etc.). The wireless sensing learning unit 50 serves to perform machine/deep learning with preprocessed data and create a learning model.

The home network connection state exchange unit 70 serves to exchange home network connection status information between the wireless sensing learning and prediction unit 10 and the device connection status utilization unit 80 of the home network.

The home network device connection state utilization unit 80 includes a home network connection state providing unit 90. The home network connection state providing unit 90 serves to provide a smart device connection state to the home network.

The PED device information utilization unit 100 includes a PED device state information providing unit 110. The PED device state information providing unit 110 may exchange PED device state information through the Wireless Sensing learning and prediction unit 10 and the PED device information exchange network unit 120.

Figure 11:
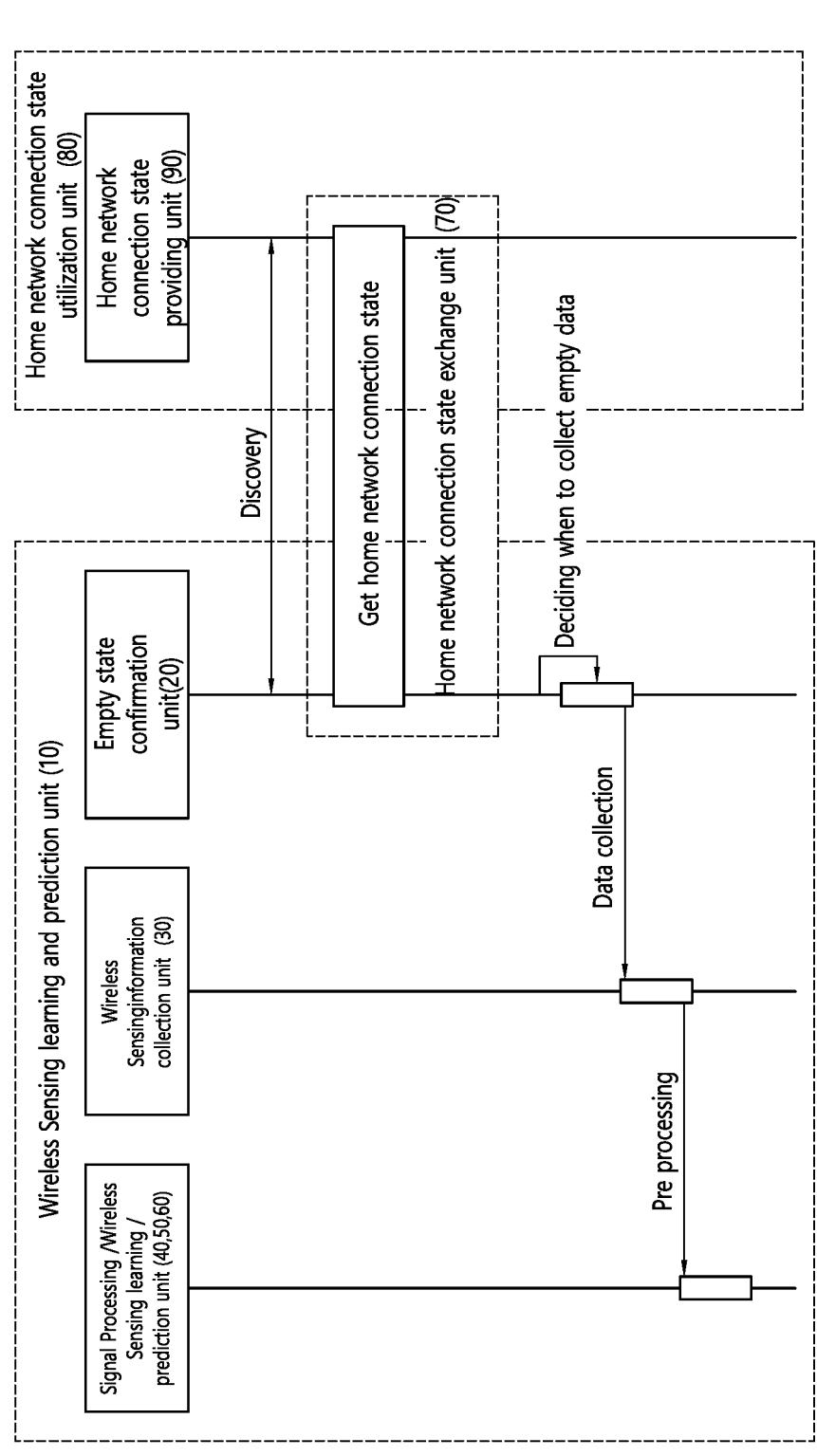
FIG. 11 shows an example of a procedure in which a wireless sensing device collects empty data by utilizing a home network connection state.

FIG. 11 shows an example of a procedure in which a wireless sensing device collects empty data by utilizing a home network connection state.

Referring to FIG. 11, the empty state confirmation unit 20 of the wireless sensing learning and prediction unit 10 may discover and check the device connection state utilization unit 80 of the home network. The empty state confirmation unit 20 may acquire home network connection state information from the home network device connection state utilization unit 80 through the home network connection state exchange unit 70. The empty state confirmation unit 20 may determine an empty data collection point based on the acquired home network connection state information.

The wireless sensing information collection unit 30 may collect data by receiving a wireless signal from the empty state confirmation unit 20. The Signal Preprocessing unit 40 serves to preprocess the collected CSI Data (De-noising, etc.). The wireless sensing learning unit 50/prediction unit 60 performs machine/deep learning with preprocessed data and serves to create a learning model.

Figure 12:
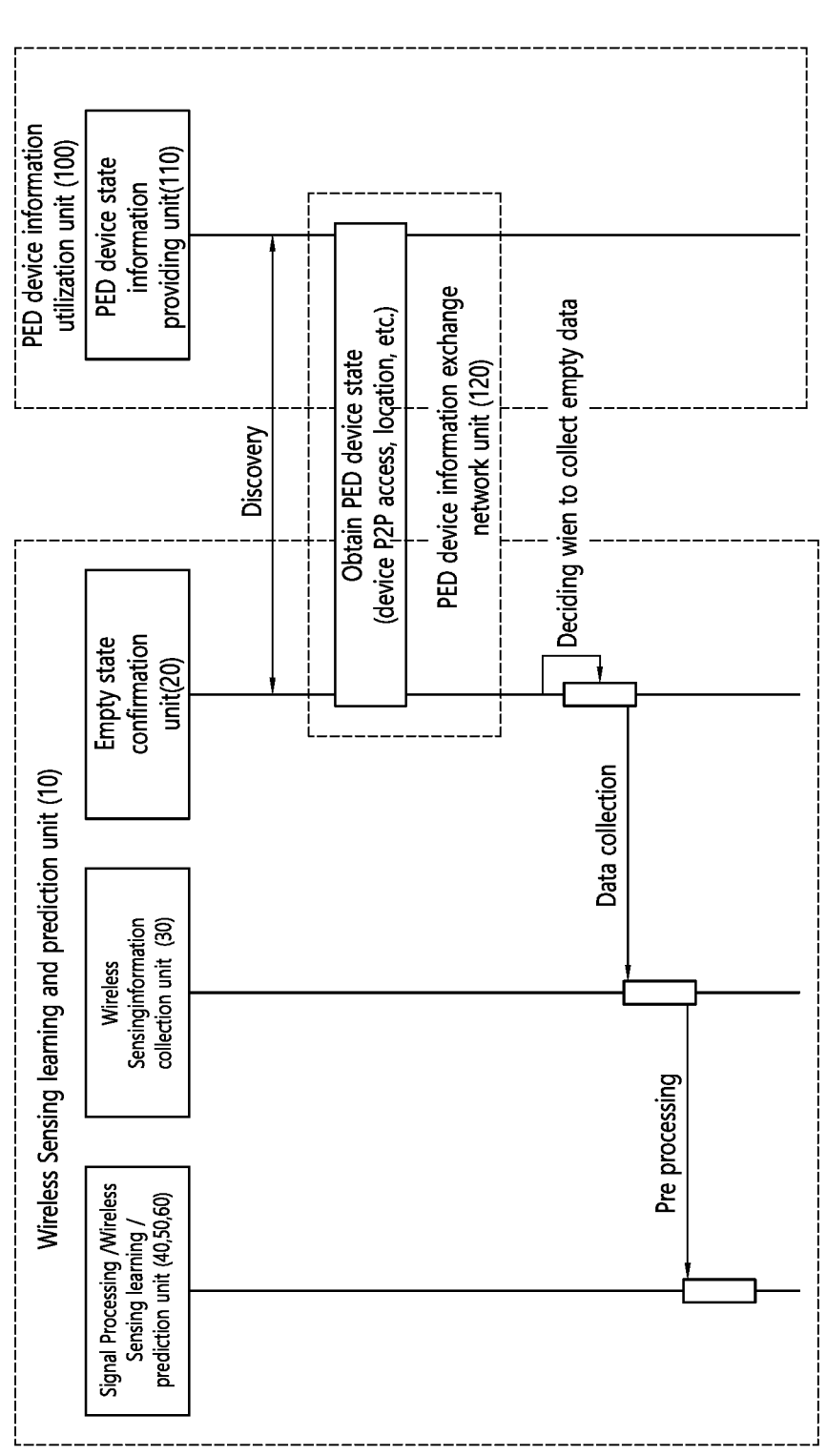
FIG. 12 shows an example of a procedure in which a wireless sensing device collects empty data using PED device information.

FIG. 12 shows an example of a procedure in which a wireless sensing device collects empty data using PED device information.

Referring to FIG. 12, the empty state confirmation unit 20 of the wireless sensing learning and prediction unit 10 may discover and check the PED device information utilization unit 100. The empty status checking unit 20 may acquire PED device status information (device P2P connection, location, etc.) from the PED device information utilization unit 100 through the PED device information exchange network unit 120. The empty state confirmation unit 20 may determine an empty data collection point based on the obtained PED device state information.

The wireless sensing information collection unit 30 may collect data by receiving a wireless signal from the empty state confirmation unit 20. The Signal Preprocessing unit 40 serves to preprocess the collected CSI Data (De-noising, etc.). The wireless sensing learning unit 50/prediction unit 60 performs machine/deep learning with preprocessed data and serves to create a learning model.

Figure 13:
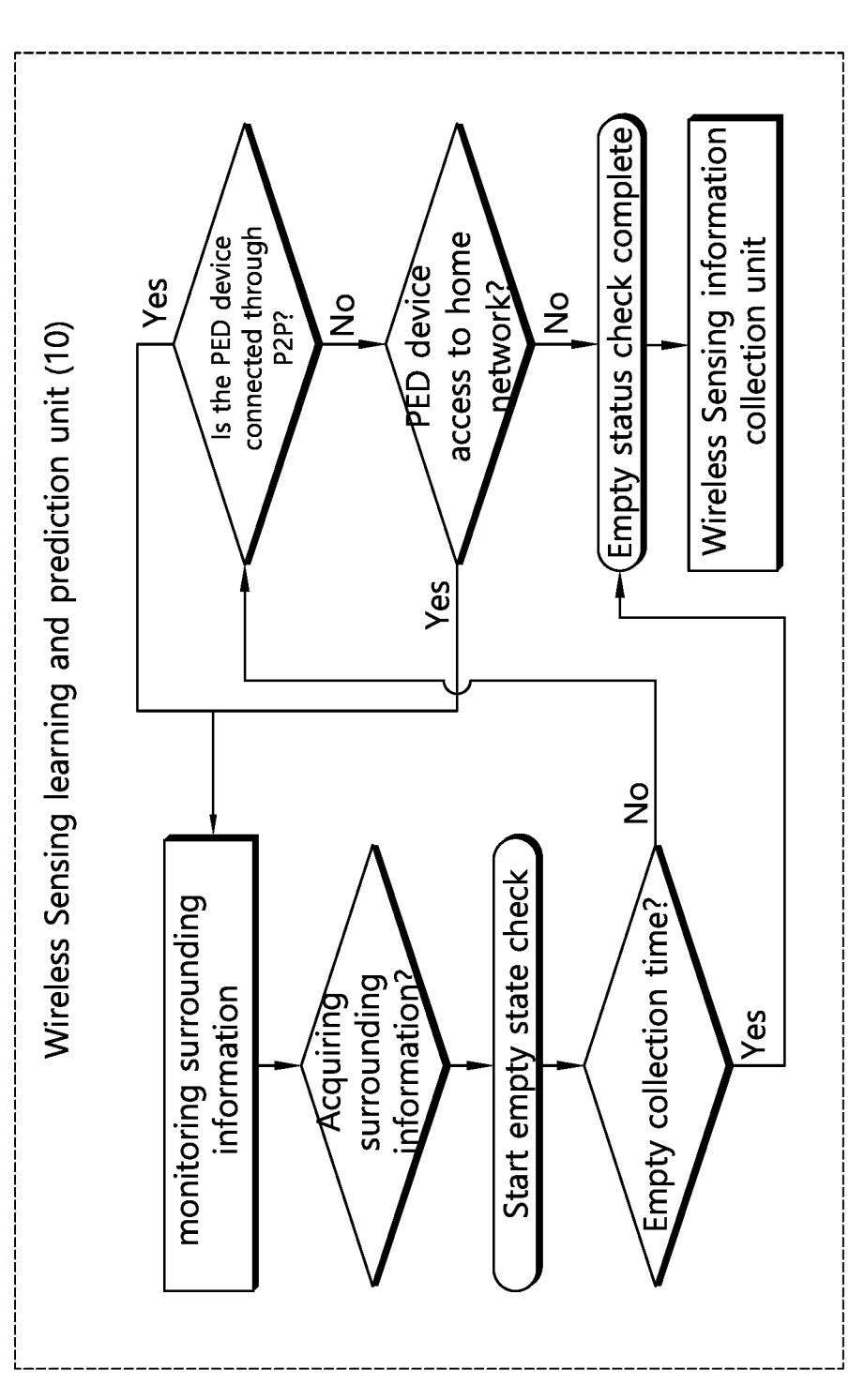
FIG. 13 shows an overall flowchart of a procedure for determining when a wireless sensing device collects empty data.

FIG. 13 shows an overall flowchart of a procedure for determining when a wireless sensing device collects empty data.

The empty state confirmation unit 20 of the wireless sensing learning and prediction unit 10 monitors the surrounding information and starts to check whether the state is empty after acquiring the surrounding information.

If the current time is the designated time to collect empty data (Yes), the empty state confirmation unit 20 may confirm that the empty state is complete and transmit the data to the wireless sensing information collection unit 30.

If the current time is not the time specified to collect empty data (No), the empty state confirmation unit 20 checks whether a PED (Personal Electronic Device) device is connected through P2P (Peer to Peer) or whether a PED device is connected to a home network. If the PED device is connected through P2P, the empty state confirmation unit 20 starts monitoring surrounding information. Even when the PED device is connected to the home network, the empty state confirmation unit 20 starts monitoring surrounding information. If the PED device is not connected via P2P and the PED device is not connected to the home network, the empty state confirmation unit 20 may transmit data to the wireless sensing information collection unit 30 after confirming that the state is empty.

Figure 14:
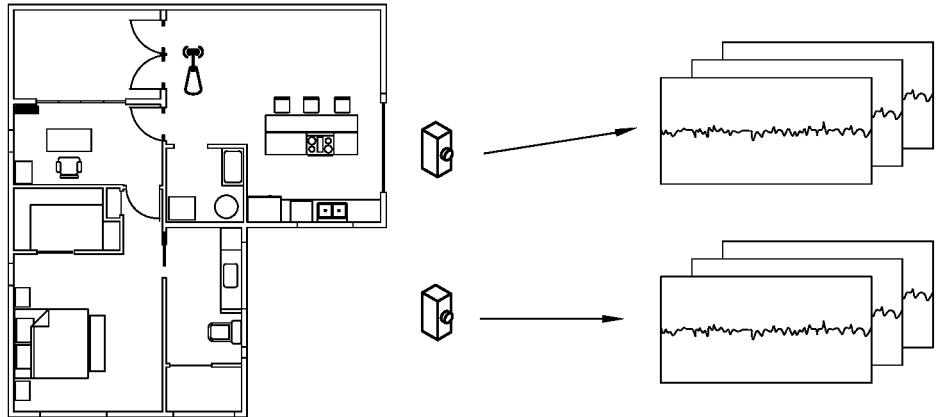
FIG. 14 shows an example of detecting an intruder through empty data collection.

FIG. 14 shows an example of detecting an intruder through empty data collection.

Figure 15:
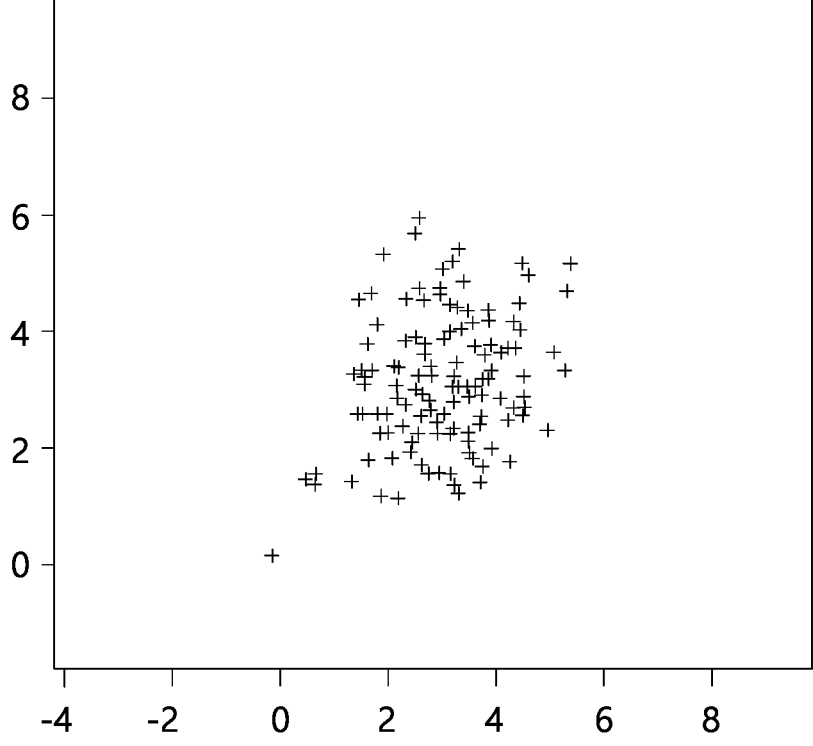
FIG. 15 shows an example of creating modeling for an empty environment through the data collected in FIG. 14.

FIG. 15 shows an example of creating modeling for an empty environment through the data collected in FIG. 14.

Figure 16:
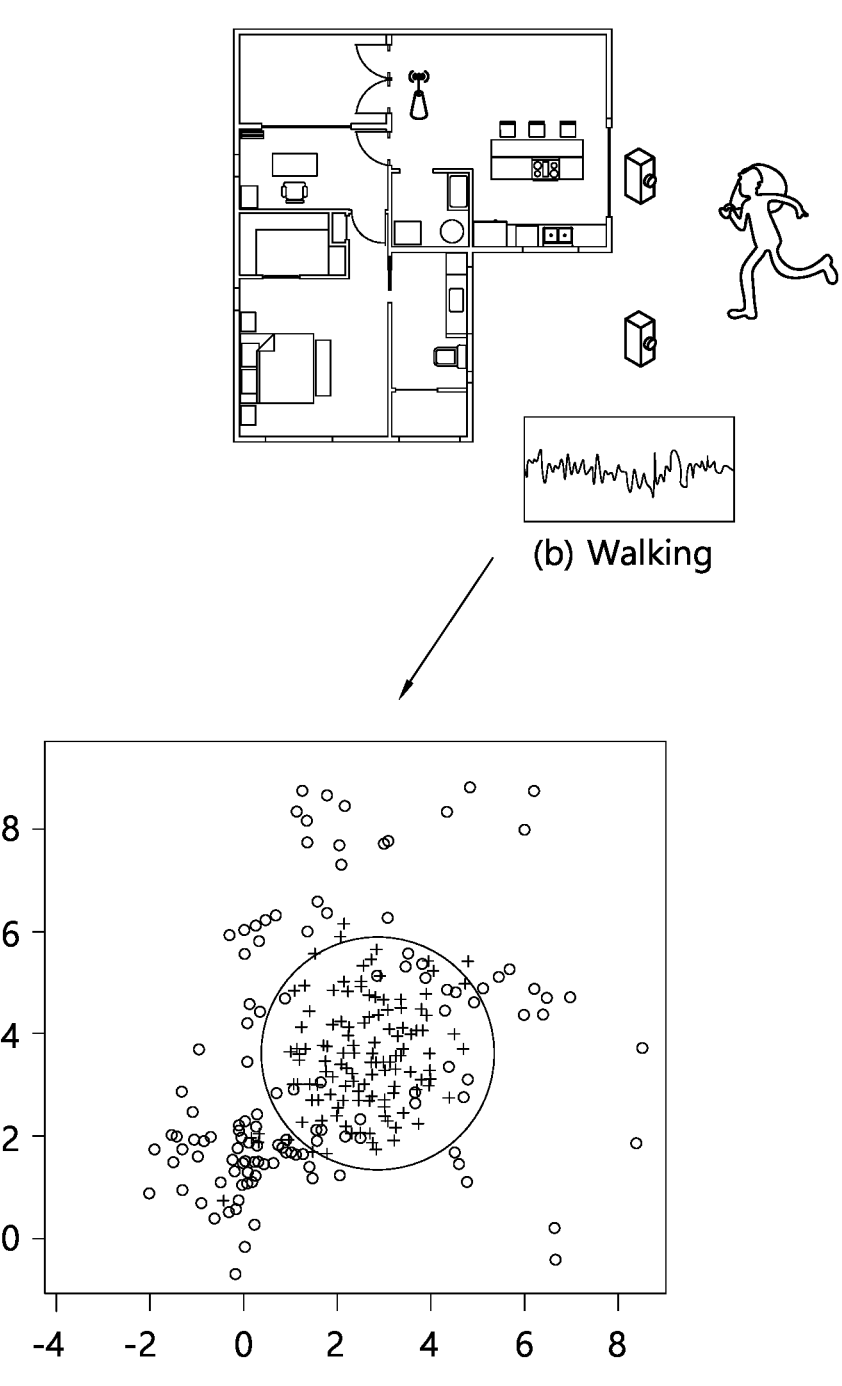
FIG. 16 shows another example of detecting an intruder through empty data collection.

FIG. 16 shows another example of detecting an intruder through empty data collection.

Referring to FIG. 14, the Wireless Sensing device determines the empty data collection point, and collects Wireless Sensing data from a place where a wireless router (AP) or PED is installed in the house. FIG. 15 shows modeling created in an unoccupied environment (empty environment) through the collected data.

Referring to FIG. 16, the wireless sensing device enters an intruder detection mode when a user goes out, and each sensor detects an intruder based on modeling information of an empty environment (FIG. 15). That is, looking at the modeling generated at the bottom of FIG. 16, seeing that it deviated from the empty environment modeling of FIG. 15, the wireless sensing device can detect that an intruder has entered.

Specifically, the Wireless Sensing device may detect an intruder by performing anomaly detection using One-Class Classification that learns and predicts only with empty data, or recognize Wireless Sensing data about an intruder and alerts and informs the user.

That is, the proposed embodiment has the following advantages. First, since the empty state is determined in advance using the home network connection state and PED information (when it is not empty), there is no need to continuously collect data. In addition, when learning is completed through empty data, it can be used for scenarios such as intruder detection. That is, after learning is completed, prediction is possible without the aid of the device.

Hereinafter, the above-described embodiment will be described with reference to FIGS. 1 to 16.

Figure 17:
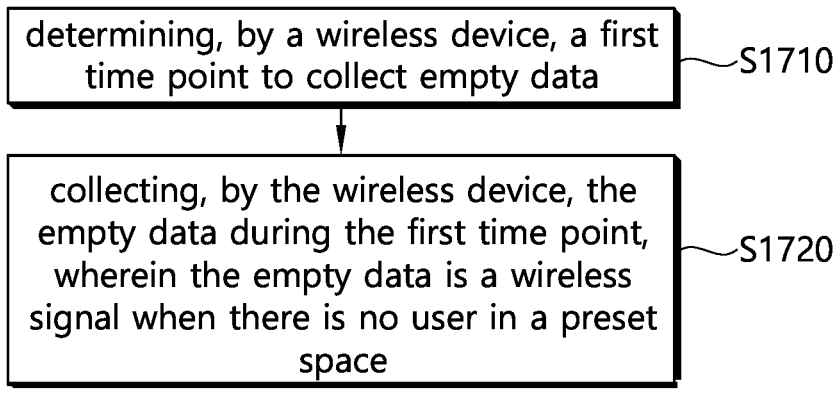
FIG. 17 is a flowchart illustrating a procedure for performing wireless sensing by collecting empty data according to an embodiment.

FIG. 17 is a flowchart illustrating a procedure for performing wireless sensing by collecting empty data according to an embodiment.

This embodiment proposes a method for effectively collecting empty data because a wireless device based on wireless sensing needs empty data for post-learning in a target environment. In particular, this embodiment can prevent unnecessary data collection when it is not in an empty state by identifying a collection time point of the empty data.

In step S1710, a wireless device determines a first time point to collect empty data. At this time, the empty data is a wireless signal when there is no user in the preset space.

In step S1720, the wireless device collects the empty data during the first time point. That is, the present embodiment can reduce the number of attempts to collect the empty data by limiting the collection time point of the empty data to the first time point.

The first time point may be determined after checking whether the state is in the empty state. The empty state is a state in which there is no user in the preset space. A method for checking whether the state is in the empty state is as follows.

For example, the wireless device may obtain first information on a Personal Electronic Device (PED) connection state of a home network. The wireless device may check an empty state based on the first information. The first information may include a system log and Dynamic Host Configuration Protocol (DHCP) allocation information. The first information may be monitored when a current time point is not the first time point. That is, since the current time point is not the time point at which the empty data is collected, the wireless device can monitor surrounding information such as the first information again.

As another example, the wireless device may obtain second information on a PED device state. The wireless device may check an empty state based on the second information. The second information may include location information of the PED device and peer to peer (P2P) connection information between the wireless device and the PED. The second information may be monitored when the current time point is not the first time point. That is, since the current point in time is not the time point at which the empty data is collected, the wireless device can monitor surrounding information such as the second information again.

Also, the wireless device may collect wireless signal during the first time point. The wireless signal may be Channel State Information (CSI) data. The wireless device may determine whether the collected wireless signal is the empty data. The wireless device may determine a second time point, which is another time point for collecting the empty data, and monitor the wireless signal when the collected wireless signal is determined not to be the empty data. That is, the wireless device can monitor different time zones to find an optimal time zone for collecting empty data.

The wireless device may generate a user model by learning and predicting based on the empty data, when the collected wireless signal is determined to be the empty data. The wireless device may perform anomaly detection based on the user model or performing intruder detection by recognizing a wireless signal of an intruder. For example, the wireless device may compare a user model learned based on the empty data and a user model learned based on the wireless signal of the intruder to detect that an intruder has entered, and notify the user through an alarm or the like.

The empty data may be data labeled with the empty state. Results learned and predicted based on the empty data (based on labeling) may be obtained based on machine learning or deep learning as a post-learning model.

3. DEVICE CONFIGURATION

Figure 18:
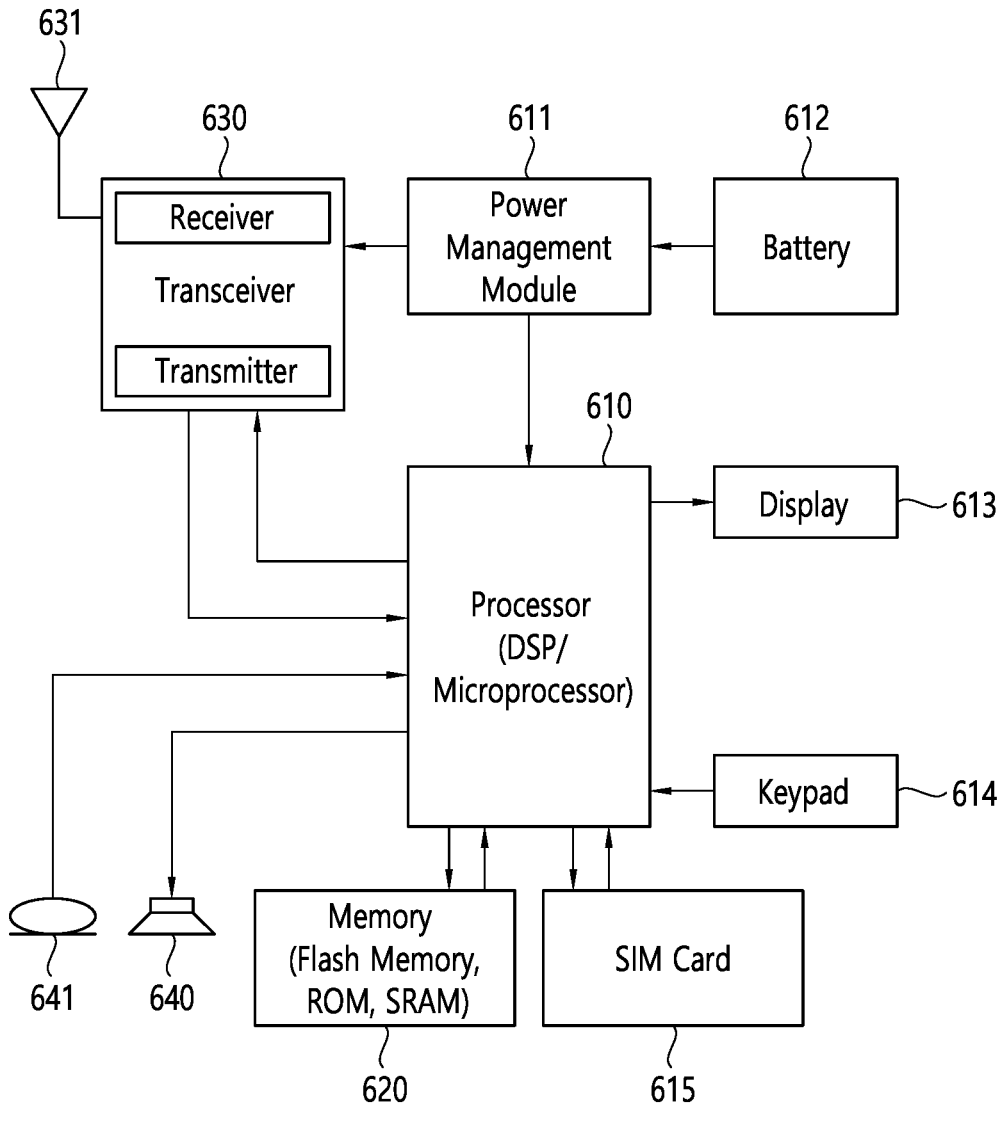
FIG. 18 illustrates modified examples of a transmitting device and/or receiving device of the present specification.

FIG. 18 illustrates modified examples of a transmitting device and/or receiving device of the present specification.

Each device/STA shown in sub-figures (a)/(b) of FIG. 1 may be modified as shown in FIG. 18. A transceiver 630 of FIG. 18 may be the same as the transceiver(s) 113 and 123 of FIG. 1. The transceiver 630 of FIG. 18 may include a receiver and a transmitter.

A processor 610 of FIG. 18 may be the same as the processor(s) 111 and 121 shown in FIG. 1. Alternatively, the processor 610 of FIG. 18 may be the same as the processing chip(s) 114 and 124 shown in FIG. 1.

A memory 150 of FIG. 18 may be the same as the memory(s) 112 and 122 shown in FIG. 1. Alternatively, the memory 150 of FIG. 18 may be a separate external memory that is different from the memory(s) 112 and 122 shown in FIG. 1.

Referring to FIG. 18, the power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 may be an integrated circuit that is intended to securely store the international mobile subscriber identity (IMSI) number and its related key, which are used to identify and authenticate subscribers on mobile telephony devices (such as mobile phones and computers).

Referring to FIG. 18, the speaker 640 may output sound-related results processed by the processor 610. The microphone 641 may receive sound-related inputs to be used by the processor 610.

The above-described technical features of the present specification may be applied to various device and methods. For example, the above-described technical features of the present specification may be performed/supported through FIG. 1 and/or FIG. 18. For example, the above-described technical features of the present specification may be applied to only part of FIG. 1 and/or FIG. 18. For example, the above-described technical features of the present specification may be implemented based on the processing chip(s) 114 and 124 of FIG. 1, or implemented based on the processor(s) 111 and 121 and the memory(s) 112 and 122, or implemented based on the processor 610 and the memory 620 of FIG. 18. For example, an apparatus herein is an apparatus for generating a user identification model based on wireless sensing, the apparatus comprising a memory and a processor operatively coupled to the memory, the processor is configured determine a first time point to collect empty data; and collect the empty data during the first time point.

The technical features of the present specification may be implemented based on a computer readable medium (CRM). For example, the CRM that is proposed in the present specification is a computer readable medium including an instruction being executed by at least one processor.

The CRM may store instructions performing operations including the steps of determining a first time point to collect empty data; and collecting the empty data during the first time point. The instructions that are stored in the CRM of the present specification may be executed by at least one processor. At least one processor being related to the CRM of the present specification may be the processor(s) 111 and 121 or processing chip(s) 114 and 124 of FIG. 1, or the processor 610 of FIG. 18. Meanwhile, the CRM of the present specification may be the memory(s) 112 and 122 of FIG. 1, or the memory 620 of FIG. 18, or a separate external memory/storage medium/disc, and so on.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claim of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless LAN system based on wireless sensing, the method comprising:

obtaining, by a wireless device, first information on a Personal Electronic Device (PED) connection state of a home network;

checking, by the wireless device, an empty state based on the first information;

determining, by the wireless device, a first time point to collect empty data after the empty state is checked;

collecting, by the wireless device, the empty data only in the first time point; and monitoring, by the wireless device, other information during a time other than the first time point, wherein the empty data is a wireless signal when there is no user in a preset space.

2. The method of claim 1, wherein the first information includes a system log and Dynamic Host Configuration Protocol (DHCP) allocation information, wherein the empty state is a state in which there is no user in the preset space.

3. The method of claim 1, further comprising:

obtaining, by the wireless device, second information on a PED device state; and checking, by the wireless device, the empty state based on the second information, wherein the second information includes location information of the PED device and peer to peer (P2P) connection information between the wireless device and the PED.

4. The method of claim 1, further comprising:

collecting, by the wireless device, wireless signal in the first time point; and determining, by the wireless device, whether the collected wireless signal is the empty data; and determining, by the wireless device, a second time point, which is another time point for collecting the empty data based on the collected wireless signal being determined not to be the empty data.

5. The method of claim 4, further comprising:

generating, by the wireless device, a user model by learning and predicting based on the empty data, based on the collected wireless signal being determined to be the empty data; and performing, by the wireless device, anomaly detection based on the user model or performing intruder detection by recognizing a wireless signal of an intruder.

6. The method of claim 5, wherein the empty data is data labeled with the empty state.

7. A wireless device in a wireless LAN system based on wireless sensing, the wireless device comprising:

a memory;

a transceiver; and a processor being operatively connected to the memory and the transceiver, wherein the processor is configured to:

obtain first information on a Personal Electronic Device (PED) connection state of a home network;

check an empty state based on the first information;

determine a first time point to collect empty data after the empty state is checked;

collect the empty data only in the first time point; and monitor other information during a time other than the first time point, wherein the empty data is a wireless signal when there is no user in a preset space.

8. The wireless device of claim 7, wherein the first information includes a system log and Dynamic Host Configuration Protocol (DHCP) allocation information, wherein the empty state is a state in which there is no user in the preset space.

9. The wireless device of claim 7, wherein the processor is further configured to:

obtain second information on a PED device state; and check the empty state based on the second information, wherein the second information includes location information of the PED device and peer to peer (P2P) connection information between the wireless device and the PED.

10. The wireless device of claim 7, wherein the processor is further configured to:

collect wireless signal in the first time point; and determine whether the collected wireless signal is the empty data; and determine a second time point, which is another time point for collecting the empty data based on the collected wireless signal being determined not to be the empty data.

11. The wireless device of claim 10, wherein the processor is further configured to:

generate a user model by learning and predicting based on the empty data, based on the collected wireless signal being determined to be the empty data; and perform anomaly detection based on the user model or perform intruder detection by recognizing a wireless signal of an intruder.

12. The wireless device of claim 11, wherein the empty data is data labeled with the empty state.

* * * * *